3,450,630
METHOD OF SEPARATING METAL IONS
Rene Bloch, Savion, Aharon Katchalsky, Tel Aviv, and Ora Kedem and David Vofsi, Rehovoth, Israel, assignors to Yeda Research and Development Co., Ltd., Rehovoth, Israel, a company of Israel
No Drawing. Filed Feb. 4, 1964, Ser. No. 342,529
Claims priority, application Israel, Feb. 7, 1963, 18,688
U.S. Cl. 210—22      12 Claims

ABSTRACT OF THE DISCLOSURE

Separating metal ions by using electrically uncharged membranes comprising polymeric matrices having etheric oxygen and/or carbonyl groups bound thereto, either by covalent bonding resulting from formation of the polymer matrix by polymerization of monomers incorporating such groups, or by bonding the same by capillary action, adsorption, gel formation or like molecular forces.

---

It is the object of the present invention to provide novel means for the separation of metal ions. It is a further object of the present invention to provide a novel type of membrane for the separation of metal ions. It is still a further object of the present invention to provide ion-specific membranes. It is a further object of the invention to provide a novel method and device for the separation of ions. Other and further objects of the invention will become apparent hereinafter.

The separation of ions present in solutions has been a problem in different fields of technology. For example, aluminum is often obtained in admixture with varying amounts of iron. The separation between these two metals is not easy and the known methods suffer from various drawbacks. There may be mentioned the separation of calcium ions from phosphoric acid and the separation of uranium from aluminum and iron. Similar problems are encountered with other ions.

The present invention has as one of its objects to provide a novel system for the separation of such ions. According to the present invention there are provided specific membranes which contain uncharged functional groups which are adapted to selectively bind one or more predetermined anions or cations out of a number of such anions or cations, from which these are to be separated.

The term selective binding refers to associations between ions or complex ions on the one hand and functional groups contained in the membrane on the other hand. The bonds formed between the anion or cation which is to be separated and the functional groups of the membrane must be specific, yet labile enough so as to result in the passage of the ions through the membrane.

Examples within the ambit of the above definition may vary between a complex such as an oxonium complex between $FeCl_4^-$ anion and an ether group as one extreme, and solute-solvent association as it appears in the direct solvation of an ion by solvent molecules, such as for example the solvation of $UO_2^{++}$ cation by tributyl phosphate, as the other extreme.

The separation of ionic species by means of solvent extraction is due to a specific interaction between the ions and functional groups of the selective solvent, e.g. ketone groups, ester groups, ether groups, hydroxyl groups, etc. It is essential that such groups be part of the novel membrane. These groups may be chemically bound to the structure of a polymeric membrane or a selective barrier may be constructed, consisting of an inert matrix whereto such solvents are held by forces such as capillary action, adsorption, gel formation and the like.

As an example of functional groups chemically bound to a membrane structure there may be mentioned such membranes as those formed from polymers like polyvinyl chloroethyl ether, polyepichlorohydrin, polymethyl vinylketone, etc., containing as active groups etheric oxygen groups in the polymer side chains, etheric oxygen groups in the polymer main chain and carbonyl groups in the polymeric side chains, respectively.

As examples of the selective barriers containing the active functional groups as parts of solvents held within inactive matrices there may be mentioned such combinations as for instance selective solvents soaked into porous polyvinyl chloride sheet plasticized with tributyl-phosphate; yet another example of such a selective barrier would be a cross-linked rubber swollen with a suitable solvent, forming a gel.

The novel membranes can be used for the selective dialysis or electrodialysis of mixtures which are to be separated. The invention covers also dialysis cells, electrodialysis cells and corresponding stacks, all of conventional structure, comprising novel membranes as defined above.

The following is intended to illustrate membranes which are of use in processes of separation of ions according to the present invention:

MEMBRANES BASED ON FUNCTIONAL OH-GROUPS

Polyvinylchloride plasticized with decyl alcohol, porous polyvinylchloride imbued with n-amylalcohol, isopropyl alcohol or benzyl-alcohol; highly crosslinked polyvinyl alcohol; a copolymer of ethylene and vinyl-acetate.

MEMBRANES BASED ON ETHERIC OXYGEN AS ACTIVE FUNCTIONAL GROUP

Porous polyvinylchloride imbued with ethyl-ether, isopropyl ether, or $\beta,\beta'$-dichloro diethyl ether; a membrane of polyvinyl-chloride and polyvinylalcohol plasticized with $\beta,\beta'$-dichloro diethyl ether; polyvinylchloroethyl ether or polyepichlorhydrin; a copolymer of methyl-methacrylate and vinyl acetate.

MEMBRANES BASED ON FUNCTIONAL KETONIC CARBONYL GROUPS

Porous polyvinyl chloride imbued with methyl isobutyl ketone or with cyclohexanone; polyvinylchloride plasticized with methyl-heptyl ketone; polyvinyl-methyl-ketone; a copolymer of vinyl-methyl ketone and vinyl acetate.

MEMBRANES BASED ON FUNCTIONAL ESTERIC CARBONYL GROUPS

A porous polyvinylchloride imbued with methyl-methylacrylate or butyl acrylate; polyethyl-acrylate or polybutyl acrylate; a copolymer of methyl isopropenyl ketone and methyl-methacrylae; a copolymer of methyl methacrylate and butyl acrylate.

MEMBRANES BASED ON FUNCTIONAL NITRILE GROUPS

Porous polyvinylchloride imbued with adiponitrile; a copolymer of acrylonitrile and vinylacetate.

A better understanding may be had of the invention by referring to the following examples, which are to be construed in an illustrative sense only.

EXAMPLES 1–7.—SEPARATION OF ALUMINUM FROM IRON

Example 1

A sheet of porous polyvinyl chloride, 1 mm. thick, was soaked in $\beta,\beta'$dichlorodiethylether and then clamped between two conventional half-cells of polymethylmethacrylate of 5 cm. diameter and 0.6 cm. width. Platinum wires were used as electrodes. Initially the cathodic compartment contained 10 ml. of a 1.5 N HCl solution in which there was dissolved 0.2 g. Fe as $FeCl_3$ and 0.4 g. Al as $AlCl_3$. The anodic compartment contained 10 ml. 1.5 N HCl. A voltage of 20 v. was applied across the cell. The initial current was 8 ma./cm.$^2$, which fell during the separation to 0.4 ma./cm.$^2$. After the passage of 763 coulombs through the cell, the cathodic compartment contained the total initial quantity of aluminum and only 0.2 mg. of iron.

Example 2

A saparation was effected as in Example 1, with identical solutions. The membrane was porous polyvinyl chloride (1 mm. thick) soaked in isobutyl methyl ketone. The current density was 7.5 ma./cm.$^2$. The passage of 157.5 coulombs resulted in the transport of $6.75 \cdot 10^{-4}$ moles of iron. No aluminum was passed through the membrane.

Example 3

A separation was carried out as in Example 1, but with a 1 mm. porous poylvinyl chloride sheet soaked in tributyl phosphate. The current density was 10 ma./cm.$^2$ and a passage of 167 coulombs resulted in a transport of $8.4 \cdot 10^{-4}$ moles of iron, while no aluminum was passed through the membrane.

Example 4

A thin polymeric sheet was prepared by heating a mixture of 1 g. powdery polyvinyl chloride and 1 g. polyvinyl alcohol and 5 ml. $\beta,\beta'$-dichloro ethyl ether to 150° C. and forming the desired membrane, which had a thickness of about 1 mm. After cooling, this membrane had a cloudy appearance. An increase of weight of 30% was obtained by swelling in water. A complete separation between iron and aluminum ions as described in Example 1 was carried out with this membrane. The current density was 3 ma./cm.$^2$. After a passage of 1090 coulombs the quantity of iron was reduced to 1 mg. per 100 mg. of aluminum.

Example 5

A sheet was prepared consisting of polyvinyl $\beta,\beta'$-chloroethyl ether, which was reinforced with glass fibers. This was used under conditions identical with those of Example 1. The passage of 200 coulombs at 1 ma./cm.$^2$ current density brought about a transportation of $6.9 \cdot 10^{-4}$ moles of iron while no aluminum was passed through the membrane.

Example 6

A membrane was prepared from poly-epi chlorhydrin. This was tested as in Example 1. In this run the aqueous solution used was 6 N hydrochloric acid. The current density was 1 ma./cm.$^2$ and the passage of 200 coulombs resulted in a transport of $2.6 \cdot 10^{-4}$ moles of iron while no aluminum was passed through the membrane.

Example 7

A sheet was prepared from a copolymer of vinyl methyl ketone and vinyl acetate (in a ratio of about 5:1 by weight). This membrane had a thickness of about 1 mm. A run was carried out as in Example 1, without the application of electric current. During the process of selective dialysis, in 3 hours, $5 \cdot 10^{-5}$ moles of iron passed to the second cell while no aluminum was passed through the membrane.

EXAMPLES 8–10.—SEPARATION OF PHOSPHORIC ACID FROM CALCIUM

Example 8

A membrane identical with that described in Example 3 was used in a conventional dialysis cell of the type described in Example 1, in order to remove phosphoric acid from a mixture of calcium chloride. The mixture used was 1.25 molar in phosphoric acid, 9.2 molar in hydrochloric acid and 0.9 molar in calcium chloride. Dialysis for 24 hours resulted in a passage of 80% of the phosphoric acid through the membrane, while no calcium passed through it.

Example 9

A polymer sheet was formed by heating 1 part powdery polyvinylchloride with 3 parts of tributylphosphate to 150° C. and forming a membrane of 1 mm. thickness. A process of dialysis as described in Example 8 was carried out. In 20 hours $6 \cdot 10^{-3}$ moles of phosphoric acid passed through the membrane while no calcium passed through it.

Example 10

As membrane there was used a sheet of porous polyvinyl chloride soaked in n-amyl-alcohol. A process of dialysis was carried out as described in Example 8. Dialysis for 24 hours resulted in the passage of $1.04 \cdot 10^{-2}$ moles of phosphoric acid through the membrane while no calcium passed through it.

EXAMPLES 11–13.—SEPARATION OF URANIUM FROM ALUMINUM AND IRON

Example 11

A membrane identical with that described in Example 3 was used for the dialysis of 10 ml. of a solution which was 0.05 molar in uranyl nitrate, 1.0 molar in iron nitrate and 1 molar in aluminum nitrate. Dialysis for 1 hour in a conventional cell as described in Example 1 resulted in the selective removal of 25% of the uranium. After 24 hours the solution was free of uranium. No aluminum and no iron passed through the membrane.

Example 12

A membrane as described in Example 9 was used for the dialysis of a mixture as defined in Example 11. After 9 hours 62% of the uranium had passed through the membrane, while neither aluminum nor iron passed through the membrane.

Example 13

A process of dialysis was carried out with a solution 0.05 molar in uranyl sulfate, 1 molar in sulfuric acid and 1 molar in iron sulfate. The membrane consisted of porous polyvinyl chloride soaked in a 10% (v./v.) solution of ethyl-hexyl phosphoric acid in hexane. After 20 hours 41% of the uranium had passed through the membrane while no aluminum or iron passed through it.

It will be apparent from the foregoing that use may be made of membranes where the selective solvent is mechanically bound to the structure of the membrane (a porous membrane imbued with the solvent). This is apt to result in losses of the selective solvent due to mechanical disturbances, gradual dissolution and the like. This can be overcome by resorting to the chemical binding of the necessary active functional groups to the structure of the membrane. The inert substance of the matrix can be plasticized by a compound which contains such active groups and there can also be prepared homo- and co-polymers in the form of sheets of suitable thickness, wherein there are incorporated the necessary active groups.

The present invention can be used for the electrodialysis of mixtures as well as for the dialysis of same. As compared with conventional membranes used for the electrodialysis which are based on electrically charged groups, the present invention relates to the production and use of novel membranes which are based on the utilization of ion-specific properties of functional, electrically uncharged, groups.

It is clear that this new principle is applicable to the separation of different ions (cations or anions) and that the preparation of membranes and separation devices will be based on the knowledge about selective solvents for such separations.

What we claim is:

1. A method for the separation of metal ions of a pre-selected species from metal ions of at least one other species, which comprises selectively permeating the ions of said pre-selected species, to the substantial exclusion of the ions of said other species, through an electrically uncharged, ion-specific membrane comprising a polymeric matrix having etheric oxygen or carbonyl functional radicals bound thereto, said matrix consisting essentially of a polymer of a vinyl alkyl ether, cyclic ether, vinyl-alkyl ketone, alkyl isopropenyl ketone, vinyl ester, vinyl alcohol, acrylic ester, or methacrylic ester monomer.

2. The method as defined in claim 1, wherein said functional group is chemically bound to said polymeric matrix.

3. The method as defined in claim 1, in which the polymeric matrix of said ion-specific membrane is a polymer of ethyl acrylate.

4. The method as defined in claim 1, in which the polymeric matrix of said ion-specific membrane is a polymer of vinyl-chloro-ethyl ether.

5. The method as defined in claim 1, in which the polymeric matrix of said ion-specific membrane is a polymer of epichlorhydrin.

6. The method as defined in claim 1, in which the polymeric matrix of said ion-specific membrane is a polymer of vinyl-methyl-ketone.

7. The method as defined in claim 1, in which the polymeric matrix of said ion-specific membrane is a polymer of methyl-isopropenyl ketone.

8. The method as defined in claim 1, in which the polymeric matrix of said ion-specific membrane is a polymer of vinyl acetate.

9. The method as defined in claim 1, in which the polymeric matrix of said ion-specific membrane is a polymer of butyl acrylate.

10. The method as defined in claim 1, in which the polymeric matrix of said ion-specific membrane is a polymer of methyl methacrylate.

11. The method as defined in claim 1, in which the several species are incorporated in a solution which is fed across one side of said ion-specific membrane, the pre-selected species permeating through the membrane by dialysis or electrodialysis.

12. The method as defined in claim 11, in which the solution contacted with said ion-specific membrane is an aqueous solution incorporating (1) iron and aluminum ions, (2) mixtures of phosphoric acid and calcium ions, or (3) uranium, iron and aluminu ions; and in which the pre-selected ionic species incorporated in said solution and permeated through the ion-specific membrane are (1) iron, (2) phosphoric acid, or (3) uranium ions, respectively.

References Cited

UNITED STATES PATENTS

| | | | |
|---|---|---|---|
| 2,730,768 | 1/1956 | Clarke | 204—180 |
| 2,739,934 | 3/1956 | Kunin | 204—180 |
| 2,812,379 | 11/1957 | Mendelsohn | 136—146 |
| 2,717,696 | 9/1955 | Schubert | 23—337 X |
| 3,228,877 | 1/1966 | Mahon | 210—22 |
| 3,244,763 | 4/1966 | Cahn | 260—677 |

OTHER REFERENCES

PVC Technology, W. S. Penn., 1962, pp. 371 and 375.
Noller, Chemistry of Organic Compounds, 1947, p. 737.

REUBEN FRIEDMAN, *Primary Examiner.*

F. A. SPEAR, JR., *Assistant Examiner.*

U.S. Cl. X.R.
204—180